2,917,429

METHOD OF DESTROYING NEMATODES EMPLOYING DIMETHYL POLYSULFIDES

Carleton B. Scott, Pomona, Irving D. Webb, Rosemead, and John W. Yale, Jr., Yorba Linda, Calif., assignors, by mesne assignments, to Collier Carbon and Chemical Corporation, a corporation of California No Drawing. Application August 17, 1956
Serial No. 604,626

6 Claims. (Cl. 167—22)

This invention relates to parasiticidal compositions effective for the control of fungi, bacteria, and nematodes, and in particular concerns compositions of such character in which one or a mixture of dimethyl polysulfides is employed as the essential active ingredient.

The present invention is based on our discovery that the dimethyl polysulfides which are defined by the general formula:

$$CH_3—(S)_x—CH_3$$

wherein "x" represents an integer greater than 2 and less than 10, are highly toxic with respect to a variety of fungus and bacterial organisms, and may be formulated with conventional toxicant adjuvants to form a variety of fungicidal and bactericidal compositions useful as sprays, impregnants, dusts, and the like. According to a preferred embodiment of the invention, these polysulfides are employed in the form of mixtures, i.e., as mixtures of compounds of the formula $CH_3—S_{(x)}—CH_3$ wherein the average value of "x" in the mixture is between about 3 and about 9. Said polysulfides are readily prepared from inexpensive materials, have very low volatilities (and hence do not readily evaporate when used in the open air), and are stable to hydrolysis.

The members of the present class of dimethyl polysulfides are preferably prepared by reaction between elemental sulfur and dimethyl disulfide. The latter is conventionally obtained by treating an aqueous sodium hydroxide solution of methyl mercaptan with oxygen whereby the mercaptan is oxidized in accordance with the equation:

$$4CH_3SH+O_2 \rightarrow 2CH_3—S—S—CH_3+2H_2O$$

The reaction is conveniently carried out by charging methyl mercaptan and 10 percent aqueous sodium hydroxide into a pressure vessel, pressuring up the vessel to about 100 p.s.i.g. with nitrogen, and thereafter passing oxygen into the vessel while cooling to maintain the reaction temperature at about 20°–30° C. When oxygen is no longer absorbed in the reaction mixture, the vessel is depressured and the reaction product is removed and purified by fractional distillation.

According to the preferred procedure, the dimethyl polysulfides of the present class are formed by direct reaction between dimethyl disulfide and elemental sulfur in accordance with the equation:

$$CH_3—S—S—CH_3+nS \rightarrow CH_3—S—(S)_n—S—CH_3$$

wherein "n" represents an integer between 1 and 7. The reaction takes place readily at temperatures between about 80° C. and about 180° C., the higher temperatures within this range being employed as "n" is increased. The reaction pressure may be maintained at or above that of the atmosphere, and is conveniently the autogenic pressure of the reaction mixture at the particular temperature employed. Usually, the reaction is complete in from about 0.5 to about 24 hours, depending upon the reaction temperature employed. If desired, the course of the reaction may be followed by periodically taking a sample of the reaction mixture and chilling it to about −60° C. Completion of the reaction is indicated when free sulfur does not precipitate from the chilled sample. Optionally, the reaction may be carried out in the presence of an inert liquid reaction medium, e.g., carbon disulfide, toluene, etc. Upon completion of the reaction, the reaction product is cooled and is purified by gas stripping with nitrogen or other inert gas, preferably under reduced pressure at ambient temperatures. Ordinarily, the product so obtained is employed as such in preparing the parasiticidal compositions of the invention, it is not being necessary to subject the product to further purification to isolate the individual compounds contained therein. The dimethyl polysulfides of the present class are yellow to brownish-yellow liquids which vary in color, viscosity, vapor pressure, etc., depending upon the number of sulfur atoms contained in the molecule. This latter factor is governed by the proportions in which the reactants are provided. Theoretically, such proportion may range from 1 to 7 gram atomic weights of elemental sulfur per gram molecular weight of the dimethyl disulfide, but in order to insure ready completion of the reaction an excess of sulfur is ordinarily provided. Any unreacted sulfur can readily be removed by cooling the reaction mixture to a low temperature and filtering off the sulfur which is thereby precipitated.

According to a less preferred mode of operation, the dimethyl polysulfides may be prepared by direct reaction between methyl mercaptan and elemental sulfur. Said reaction is carried out simply by heating a mixture of methyl mercaptan and sulfur, in a ratio of from 2 to 8 or more gram atomic weights of sulfur per gram molecular weight of methyl mercaptan, at a temperature between about 80° C. and about 180° C. and under autogenic pressure until the reaction is complete. The crude reaction product is then purified by gas stripping and/or fractional distillation to isolate the polysulfide product.

The following examples will illustrate the preparation of several of the dimethyl polysulfide products of the present class, but are not to be construed as limiting the invention. All proportions are in parts by weight.

Example I

A mixture of 160 parts of sulfur, 48 parts of methyl mercaptan, and 76 parts of carbon disulfide was introduced into a pressure vessel and heated at 80°–100° C. for 68 hours, during which time the pressure was maintained at 60–80 p.s.i.g. by suitably venting the vessel. The reaction mixture was then cooled to room temperature and filtered to remove a small quantity of unreacted sulfur. The filtrate was gas stripped with nitrogen at 60° C. under 1 mm. pressure for 1.5 hours, whereby the carbon disulfide and a small amount of dimethyl disulfide were recovered. The stripped residue was a somewhat viscous yellow liquid whose analysis indicated it to be dimethyl nonasulfide, $CH_3—(S)_9—CH_3$.

Example II

Ninety-four parts of dimethyl disulfide and 64 parts of sulfur were charged to a pressure vessel and heated at 150° C. for 5 hours under autogenic pressure. Complete reaction was achieved, as indicated by no free sulfur precipitating when a sample of the reaction product was cooled in a mixture of Dry Ice and acetone for 1 hour. The reaction product was then blown with nitrogen at room temperature under 1 mm. pressure for about 1 hour to remove volatile by-products. Analysis of the purified product established it to be a mixture of dimethyl polysulfides containing an average of 4 sulfur atoms per molecule.

The parasiticidal compositions of the present invention are prepared by combining one or a mixture of dimethyl polysulfides of the present class with a liquid or solid carrier in the conventional manner. Thus, one or a mixture of such products may be dispersed in water with the aid of a dispersing agent to form a concentrate composition which is subsequently diluted with water to form a spray suitable for application to living plants, lumber and other materials subject to attack. Alternatively, the products may be admixed with an inert solid diluent such as talc, diatomaceous earth, aluminum silicate, etc. to form dry compositions which can be employed as such in the form of dusts or which can be dispersed in an aqueous or oleaginous medium to form a liquid spray. In general, any of the conventional formulation and application techniques may be followed in employing the present parasiticidal compositions, and any of the various known wetting agents, spreaders, sticking agents, diluents, etc. may be employed in combination with such products. The latter are substantially non-phytotoxic and may be applied to living plants in relatively high concentrations. However, as will be apparent from the test data presented below, they are effective in very small quantities, and in the interests of economy they are usually applied at concentrations of the order of 50-1000 parts per million. Liquid concentrate compositions usually contain between about 1 and about 15 percent of the active ingredient and sufficient of an emulsifying or dispersing agent to maintain the active ingredient uniformly dispersed in the liquid suspending medium. Solid concentrate compositions usually contain between about 5 and about 50 percent by weight of the active ingredient and, optionally, small amounts of spreading agents and other conventional adjuvants.

The following examples will illustrate the formulation of a number of parasiticidal compositions within the scope of the invention, but are not to be construed as limiting the same.

*Example III*

| | Lbs. |
|---|---|
| $(CH_3)_2S_3$ | 2.0 |
| Attapulgus clay | 2.5 |
| Aluminum silicate | 40.0 |
| Powdered blood albumen | 0.2 |

The ingredients are throughly admixed in a ball-mill to obtain a fungicidal dusting composition.

*Example IV*

| | Lbs. |
|---|---|
| Mixed dimethyl polysulfides averaging $(CH_3)_2S_7$ | 2.5 |
| Water | 50.0 |
| Powdered blood albumen | 0.25 |

The dimethyl heptasulfide and blood albumen are added to the water, and the mixture is then passed through a colloid mill or high speed blender to obtain a concentrate composition which can be diluted 1000:1 to obtain a fungicidal spray.

*Example V*

| | Lbs. |
|---|---|
| $(CH_3)_2S_9$ | 0.5 |
| Benzene | 5.0 |
| Non-phytotoxic spray oil | 4000.0 |

This composition is suitable as a tree spray.

*Example VI*

| | Lbs. |
|---|---|
| $(CH_3)_2S_4$ | 10.0 |
| Kerosene extract oil | 150.0 |

This composition is suitable for impregnating lumber.

*Example VII*

| | Lbs. |
|---|---|
| $(CH_3)_2S_6$ | 2.5 |
| Water | 50.0 |
| Commercial sticking agent | 0.5 |
| Commercial spreading agent | 0.5 |

The ingredients are mixed in a colloid mill and are thereafter diluted with 1200 gallons of water to obtain a spray composition containing about 250 parts per million of the active ingredient.

*Example VIII*

| | Lbs. |
|---|---|
| $(CH_3)_2S_5$ | 0.5 |
| Non-ionic dispersing agent (Tween 80) | 0.2 |
| Water | 500.0 |

This composition is suitable for use as a bactericide.

*Example IX*

| | Lbs. |
|---|---|
| Mixed dimethyl polysulfides averaging $(CH_3)_2S_4$ | 1.0 |
| $(CH_3)_2S_5$ | 1.0 |
| Walnut shell flour | 40.0 |
| Petroleum sulfonates | 0.3 |

The ingredients are thoroughly admixed in a ball-mill to obtain a dry concentrate composition which can subsequently be diluted with water to form a spray.

In order to demonstrate the fungicidal activity of the present products, the following procedure is employed: The material to be tested is formulated into a wettable powder by grinding together and intimately admixing the following ingredients:

| | Pts. by wt. |
|---|---|
| Test material | 10.0 |
| Attapulgus clay | 30.0 |
| "Neoterge" wetting agent | 0.12 |
| "Duponol ME" wetting agent | 0.05 |
| Lignin sulfate suspending agent | 0.12 |

A 10-gram sample of the composition is added to enough distilled water to make 100 grams, and the solution is homogenized for three minutes in a high-speed blender. With the blender still operating, 3 grams of the liquid are removed therefrom and stirred into 75 grams of liquid potato dextrose agar at 45° C. and the agar is transferred to a Petri-dish. The agar so prepared contains 1000 p.p.m. of the material to be tested. If lower concentrations are to be tested, e.g., 10 or 100 p.p.m., 1-gram portions of the concentrate composition in the blender are diluted accordingly. The agar is allowed to cool, whereupon it solidifies, and a ¼" disc of the test fungus inoculum is placed on the surface of the agar. The inoculated agar is incubated for seven days, after which the extent of the fungus growth is measured, and the percent of inhibition of fungus growth is calculated as follows:

$$\text{Percent inhibition} = 100 - \frac{\text{Growth on test sample}}{\text{Growth on blank}} \times 100$$

The following tabulation presents inhibition values obtained by subjecting several of the present products to the foregoing test procedure employing a variety of test organisms.

| Product Tested | | Percent inhibition | | | | | | | | | |
|---|---|---|---|---|---|---|---|---|---|---|---|
| Identity | Conc., p.p.m. | R. solani | S. rolfsii | F. roseum | P. cinnamomi | P. ultimum | S. sclerotiorum | S. fructicola | B. cinerea | A. solani | Average for all Organisms |
| $(CH_3)_2S_3$ | 100 | 81.8 | -------- | 50.0 | ---------- | 100 | 100 | ---------- | 96.3 | 95.2 | 87.2 |
| Mixed dimethyl polysulfides averaging $(CH_3)_2S_4$ | 100 | 92.1 | -------- | 54.8 | ---------- | 100 | 100 | ---------- | 97.5 | 100 | 90.7 |
| $(CH_3)_2S_6$ | 100 | 62.5 | 83.0 | -------- | 96.7 | 100 | 68.5 | 65.7 | 50.0 | 57.2 | 72.9 |
| $(CH_3)_2S_9$ | 1,000 | 100 | 100 | -------- | 100 | 100 | 100 | 100 | 100 | 100 | 100 |
| $(CH_3)_2S_2$ | 100 | 0 | 0 | -------- | 0 | 0 | 0 | 0 | 0 | 0 | 0 |
| Sulfur | 100 | | | | | | | | | | 6 |
| "Captan"[1] | 100 | | | | | | | | | | 74 |
| Do | 1,000 | | | | | | | | | | 90 |
| "Phygon"[1] | 100 | | | | | | | | | | 59 |
| Do | 1,000 | | | | | | | | | | 83 |

[1] Common commercial fungicides.

It will be noted from the above data that the present products surpass two of the widely employed commercial fungicides, and that their effectiveness is far greater than that of either of the two materials from which they are prepared.

In testing the present products for bactericidal action, the concentrate solution is added to a standard culture medium consisting of potato dextrose agar, yeast extract, peptone, and calcium carbonate to give the desired concentration, and the medium is inoculated with the test organism. After incubation for 7 days the medium is examined for bacterial growth. The following results were obtained with $(CH_3)_2S_9$:

| Test Organism | Bacterial Growth | |
|---|---|---|
| | at 100 p.p.m. | at 1,000 p.p.m. |
| Erwinia carotovora | None | None. |
| Pseudomonas syringae | Moderate | Slight. |
| Agrobacterium tumefaciens | None | None. |
| Xanthomomas juglandis | do | Do. |

In addition to their fungicidal and bactericidal properties, the present compositions are effective in controlling nematodes. At a concentration of 100 p.p.m., $(CH_3)_2S_3$ provided 86% control of root knot nematodes on tomato plants with a general increase in plant growth of 19%. Dimethyl nonasulfide provided 100% nematode control with a growth increase of 17%. When employed for such purpose, the composition may be directly admixed with the nematode-infested soil, or it may be applied in the form of an emulsion in ordinary agricultural aqua ammonia.

Other modes of applying the principle of our invention may be employed instead of those claimed, change being made as regards the methods or materials employed, provided the product stated by any of the following claims or the equivalent of such stated products be employed.

We, therefore, particularly point out and distinctly claim as our invention:

1. The method of controlling the growth of nematodes in the soil which comprises admixing with said soil a nematocidal amount of a dimethyl polysulfide of the formula:

$$CH_3-S_{(x)}-CH_3$$

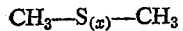

wherein "x" represents an integer greater than 2 and less than 10.

2. A method as defined by claim 1 wherein the said dimethyl polysulfide is dimethyl trisulfide.

3. A method as defined by claim 1 wherein the said dimethyl polysulfide is dimethyl trisulfide and is employed in the form of a dispersion in water.

4. A method as defined by claim 1 wherein said dimethyl polysulfide is in admixture with an inert pesticidal carrier material.

5. A method as defined by claim 4 wherein said carrier material comprises water.

6. A method as defined by claim 4 wherein said admixture contains between about 50 and about 100 parts per million of said dimethyl polysulfide.

References Cited in the file of this patent

UNITED STATES PATENTS

| 2,527,948 | Lyon | Oct. 31, 1950 |
| 2,560,421 | Eby | July 10, 1951 |

FOREIGN PATENTS

| 876,175 | Germany | July 8, 1949 |
| 249,830 | Great Britain | Feb. 18, 1926 |

OTHER REFERENCES

Frear: Chem. of Insect., Fung., and Herb., 2nd ed., 1948, pp. 280–287.

Chem. Abstr., vol. 29, p. 4265[3] (1935).